(12) United States Patent
Kaner

(10) Patent No.: US 7,431,212 B2
(45) Date of Patent: Oct. 7, 2008

(54) PRACTICAL MOBILE DATA COLLECTION AND PROCESSING SYSTEM WITH BAR-CODED TALLY RULER

(76) Inventor: Kuter Kaner, 1008 Afton Way, Smyrna, GA (US) 30080

( * ) Notice: Subject to any disclaimer, the term of this patent is extended or adjusted under 35 U.S.C. 154(b) by 0 days.

(21) Appl. No.: 10/907,983

(22) Filed: Apr. 22, 2005

(65) Prior Publication Data

US 2005/0236487 A1    Oct. 27, 2005

Related U.S. Application Data

(60) Provisional application No. 60/564,117, filed on Apr. 22, 2004.

(51) Int. Cl.
G06K 7/10       (2006.01)
(52) U.S. Cl. .................. 235/462.01; 235/462.09; 33/755; 33/763
(58) Field of Classification Search ............ 235/462.01, 235/462.09, 462.45, 462.46, 462.16; 33/755, 33/760, 762, 763
See application file for complete search history.

(56) References Cited

U.S. PATENT DOCUMENTS

| | | | | |
|---|---|---|---|---|
| 5,528,517 | A * | 6/1996 | Loken | 702/156 |
| 6,237,243 | B1 * | 5/2001 | Cook | 33/770 |
| 6,845,912 | B2 * | 1/2005 | Scannell | 235/462.01 |
| 7,057,548 | B1 * | 6/2006 | Roberts | 342/22 |
| 2004/0035012 | A1 * | 2/2004 | Moehnke et al. | 33/494 |

\* cited by examiner

Primary Examiner—Ahshik Kim

(57) ABSTRACT

A bar-coded ruler (Sierra RapidScan Ruler) and a mobile computer application system (Sierra DigiTally) are developed to efficiently measure and capture dimension, type, quality, and quantity data of objects with three dimensional measurements, particularly of lumber and similar products. The ruler contains bar codes for measuring and inputting related data. The ruler and the system are mobile and they are carried to field of operation for capturing data electronically. Collected data may be transmitted to another computer by cabled or wireless connection.

2 Claims, 5 Drawing Sheets

FIG. 4

Work         Describes a unit of data collection
- WorkID
- Descr
- Stat
- CreateDate
- DeviceID
- ReceiveDate

WorkItem       Describes each product item that is related to work
- WorkID
- Item
- Product
- Grade
- Units
- Thickness
- Thickness_Denom
- Thickdecimal
- Orderqty
- Ordermeasure
- Qty
- Measure
- Shrinkpercent
- Productdesc

Tally        Holds detailed tally records for each WorkItem record
- WorkID
- Item
- Bundleid
- Length
- Width
- Qty
- Measure

PRACTICAL MOBILE DATA COLLECTION AND PROCESSING SYSTEM WITH BAR-CODED TALLY RULER

RELATIONSHIP TO PROVISIONAL APPLICATIONS

This application is a continuation of provisional application No. 60/564,117 filed Apr. 22, 2004.

BACKGROUND OF INVENTION

Taking physical dimensional measurements, calculating unit measurement value, counting inventory, while keeping track of type and quality information of lumber and other similar materials with width, length, and thickness or height (X,Y,Z) dimensions, storing and processing all of the information efficiently presents a particular challenge in inventory control, materials tracking, and transportation of such products. In wood products industry, lumber boards are measured and tallied by their thickness, length, and width; the task can involve sorting and grouping, grading, measuring, computing, and recording data. At the present, the practical and portable methods available for dimensional data collection are limited in efficiency and scope. Usually, to capture dimension measurements (X,Y,Z), a two-step approach is necessary; a measurement is taken, then the data is recorded. The data can be computed and accumulated by a calculator. Current methods do not offer the operator the ability to capture all three dimensions (X,Y,Z), type, and quality information with efficiency due to limitations in the apparatus and/or hardware and software interface. These methods are impractical and error prone as the user must pause or interrupt their work to accumulate, compute, and save all necessary information.

SUMMARY OF THE INVENTION

It is an object of the present invention to provide an efficient method to measure and capture dimensional data (X,Y,Z), type, quality, unit of measure, and quantity data of materials with three dimensions, particularly of lumber and similar products, compute, store, organize, and transmit information electronically. The invention comprises of a bar-coded tally ruler and a mobile application system that captures the data via bar-code scanner quickly and efficiently. The ruler and the system offers a unique practical method to capture data; while the ruler is held against the object's edge to be measured, the measurement value is scanned by a bar-code reader. The ruler contains bar-codes for each measurement unit to indicate the value being measured. The invention reduces the number of steps required to measure and capture data, reduces chance for errors, increases the rate of input, and eliminates the need for connection cables or manual entry. The value measured and the value recorded is the same, hence eliminating potential for errors in computations. A single scan action saves dimensional data and computes totals based on volume or surface computation formulas. Data is stored on a mobile computer and it can be transmitted to another computer for additional processing.

It should be emphasized that the term "comprises/comprising" when used in this specification is taken to specify the presence of stated features, steps or components but does not preclude the presence or addition of one or more other features, steps, components or groups thereof.

DESCRIPTION OF DRAWINGS

The present invention is described in more detail, reference being made to the accompanying drawings, in which FIG. 1. is an illustration of the bar-coded ruler
FIG. 4 is the data model diagram
FIG. 5. is the application tally data collection screen

DETAILED DESCRIPTION

Figure 1:
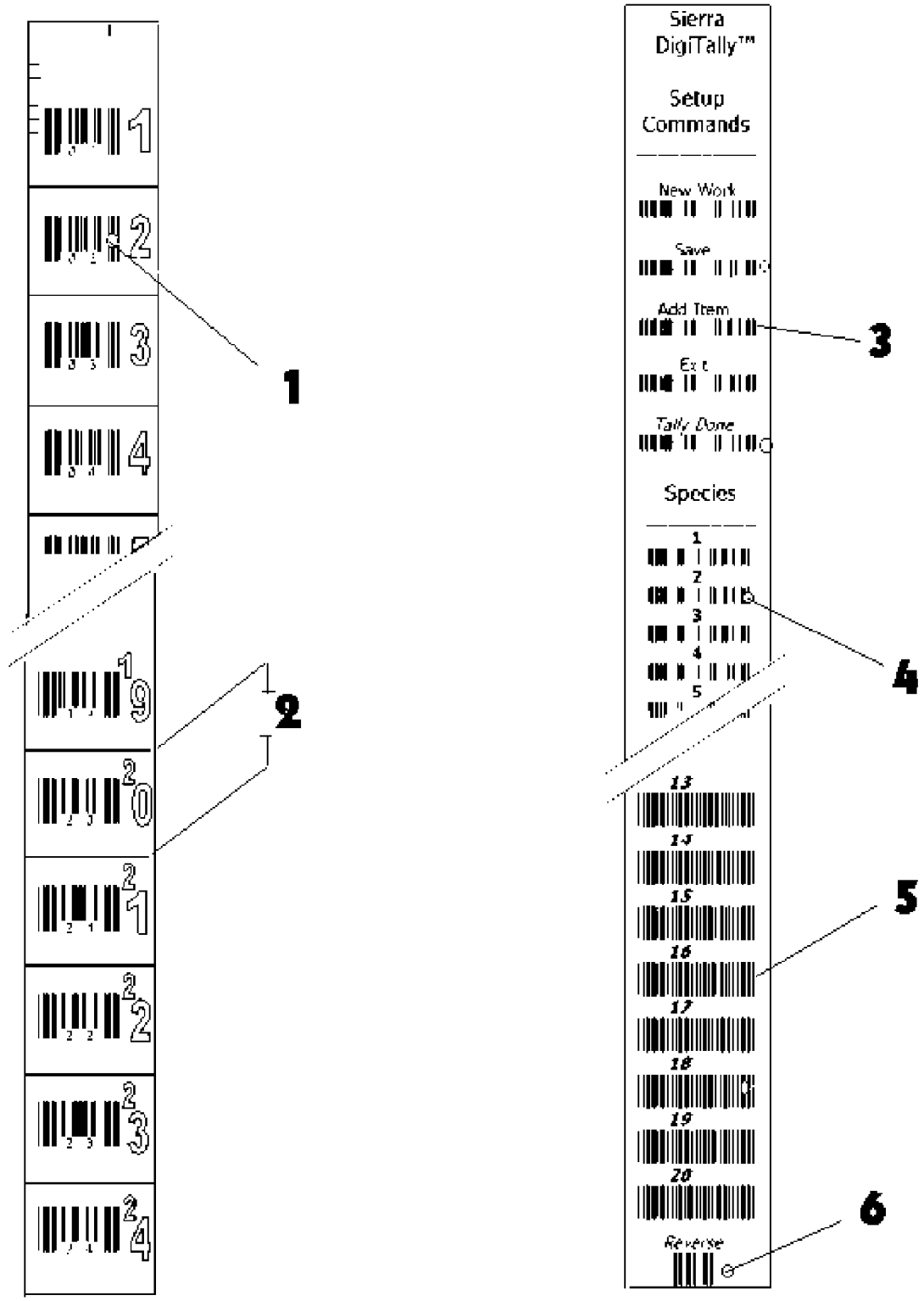

FIG. 1 illustrates the bar-coded tally ruler. The ruler is constructed of thin aluminum or steel for flexibility and strength, it is 24 inches long and 1.25 inches wide, however it can be longer and wider, or shorter and narrower, based on application requirements. It contains imprinted bar-codes on both the front and the back face including information used in data collection process. Bar-codes and information are printed on a white background for improved scanning rate and coated for protection against scratches. Bar-codes on the front face are spaced at one inch increments, depicting actual ruler measurement marks in inches; the marks and bar-codes can be arranged to take measurements in centimeters. When used in taking a measurement, operator holds hooked end of the ruler against one end of the object's width, and observes the bar-code area at the other end of the ruler that corresponds to the end of object's width, then scans the bar-code to receive the actual measurement electronically. The bar-code marks 1, start at 0.5 inch and extend into the next inch to allow for rounding, covering a range from 0.5 inches up to 1.5 inches. For example, in 2, an object measuring 19.7 inches falls in the 20 inch area, and it is scanned as value 20, an object measuring 19.3 inches is scanned in the 19 inch area. On the back face of the ruler, special commands 3 contain commands that control behavior of the application. In wood products applications, the ruler includes product type and quality information such as species, and grades as shown in 4. 5 depicts length values imprinted; the values are for scanning only and they are not used in actual measurement. Application enters into a subtraction mode to reverse transactions by scanning 6, if necessary.

Figure 2:
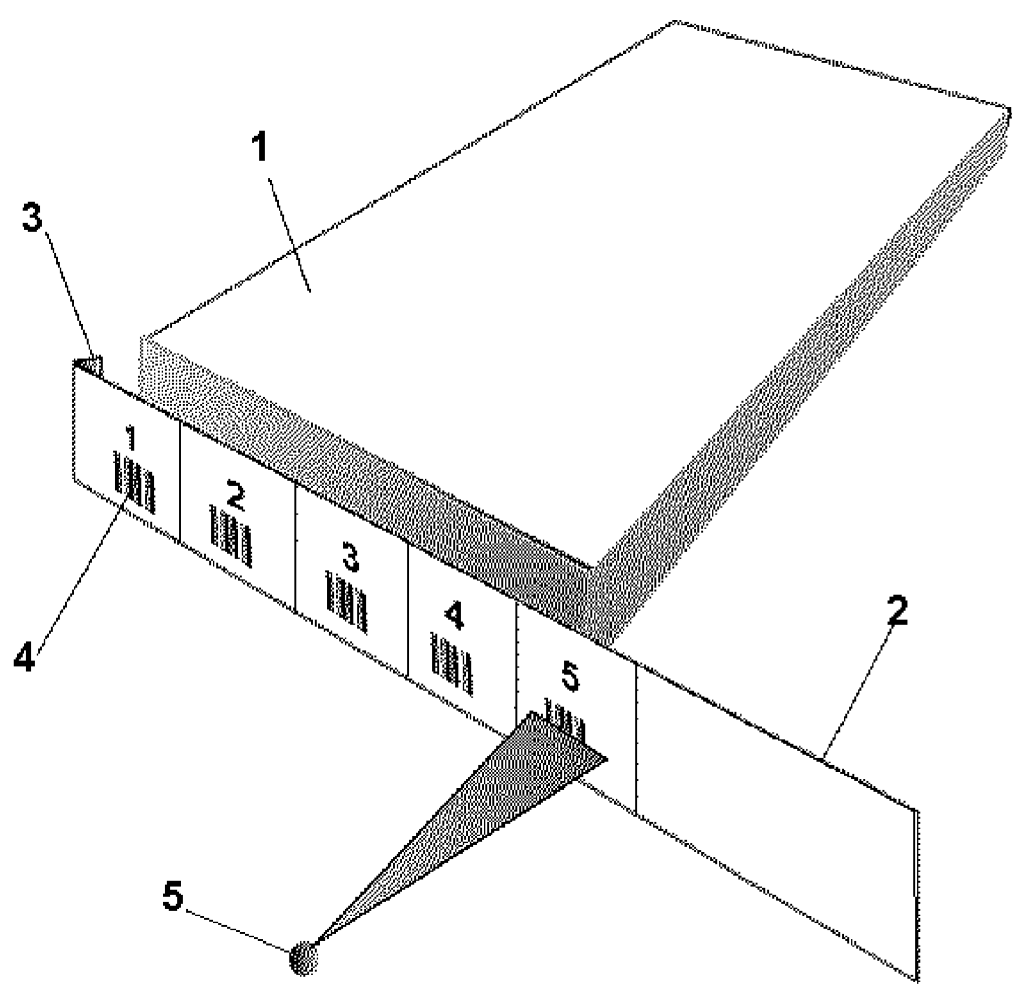
FIG. 2 is the illustration of the bar-coded ruler measuring an object

FIG. 2 illustrates the bar-coded ruler measuring an object. 1 is the object to be measured, in wood products applications, this represents a lumber board and the width dimension is measured. The bar-coded tally ruler is 2. Hook 3 is used in catching the end of the object to secure it in place while the measurement is being taken. Bar-codes 4 are located at each measure mark. Bar-code laser scanner 5 sends a beam to read the measurement; the data is captured by the device sending the beam and it is processed in the application software running on the device.

Figure 3:
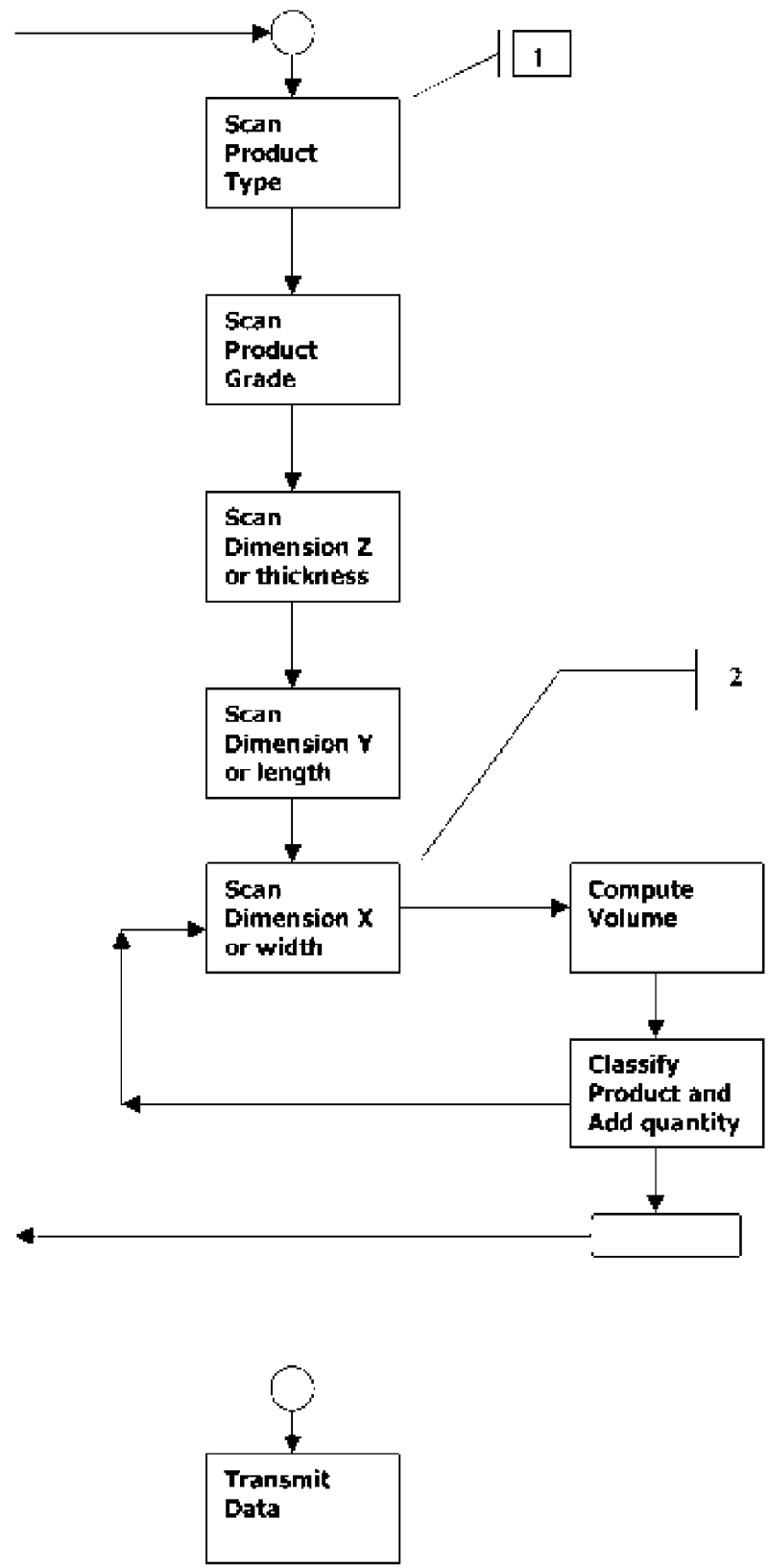
FIG. 3 is the process flow diagram

FIG. 3 illustrates process flow. User starts the process by selecting the type of product for which the data collection will take place; user scans product type 1, scans grade if applicable, and continues with dimensional data entry. In wood products industry, user specifies the thickness, and length data, then proceeds to take measurement of the width values using the front of the ruler; the process of measuring and counting width of lumber is referred as end-tallying. Each time a width measure is scanned, in 2, the application registers all the data values, computes volume or surface measure, adds one to total count, and sums the total measurement. In this case, the width dimension is the data entry dimension that triggers the adding and computing process. If user determines to change the other dimensions, or product type, he or she can scan any of the values at any time; scanning these values will not trigger an add/compute process, it will classify the new data collection-set for continued data entry without interruption, in wood products industry the classification is based on species, grades, and thickness. User may return to the previous data-set at any time, by scanning the product species, grade, or thickness values. If this behavior is not desired, user may turn its option off, limiting data entry only to dimensional values of length and width. Computation of measurements in board-feet, square-feet, linear feet, each, cubic meters, square meters, meters, are included in the application program based on the product type and its unit of measure. Other computations and formulas may be programmed.

Application software, Sierra DigiTally, runs on Microsoft Pocket PC mobile platform and on devices with bar-code readers, or attached bar-code readers. Operation of the bar-coded tally ruler and the application can be stand-alone or in connection with other computers such as a desktop computer. In stand-alone mode, the system allows user to specify data collection sets directly on the mobile device. Data collection sets may be also defined on a desktop computer using the Administrator module of Sierra DigiTally software and transmitted to the mobile device. Once data collection process is completed on the mobile device, it may be sent to the desktop computer. The data is stored in a relational database format and converted to Microsoft Access® database on the host computer. Any ODBC compliant software may access the database. FIG. 4. Discloses the data model. Sierra DigiTally prints data and bar codes when a supported portable printer is connected to the mobile computer. The printing is done by sending printer control commands along with the data to the communications port. User selects printing options by running the Sierra DigiTally Interface program on the device. The application also provides common reports so that user may view data summarized and/or grouped in various configurations.

In order to read and interpret the scanner data, the application utilizes mobile pc manufacturer supplied scanner dynamic link libraries that is compatible with the CPU and the bar-code scanner hardware. Through the use of the functions, the data scanned is retrieved into the application and processed. Values scanned from the front of the tally ruler (width values) are interpreted in raw form, i.e. when an integer value is received, it is accepted into the program and processed. Values scanned from the back face of the ruler contain a prefixed code or value to help determine type of data, such as the length value is indicated by values of 100 and higher; the application subtracts 100 to receive the actual data value. Sierra DigiTally application will examine each data element value to find out whether a record-set matches the scanned choices, if a match is found, the application will locate, display that record, and continue to accumulate totals for that data-set. If a data-set is not found, the application will create a new data-set. This option is controlled by user by turning "Live items" choice on or off. When turned off, the application will not allow to change product type, grade, or thickness; in this mode, the system will register length and width values only.

Figure 5:
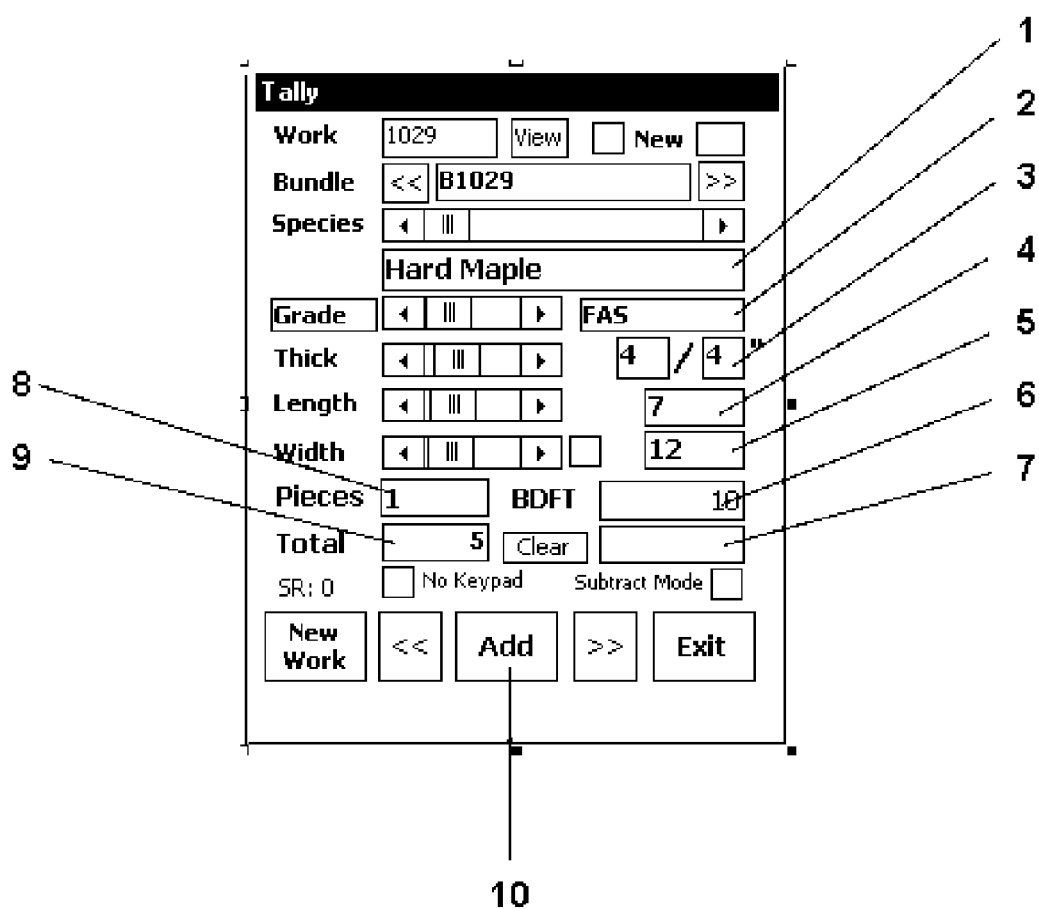

FIG. 5. shows mobile application tally data collection screen. All data elements on this screen can be entered from the keypad of the mobile device, tapped on screen, or scanned via bar-code reader. Species 1, grade 2, and thickness 3 are scanned to define the product data-set, length 4 is one of the dimensions required in the computation, width 5 is scanned using the bar-coded tally ruler. When width 5 is scanned the application processes all of the given information, computes measurement 6, and adds to total measurement for the data-set 7. User may also add the record by manually tapping Add button 10. Pieces 8 indicate the number of individual pieces in this measurement; by default it is set to one, as each material is measured one by one. The value may be increased to add measurements in batches, or "block-tally" operation as referred in wood products industry. Total 9 shows accumulated total pieces for this data-set. Grade 2 may be entered or scanned from the tally ruler to perform grading operations.

The foregoing disclosure and the claims describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each naturally fall within the breadth of protection encompassed by this patent.

What is claimed is:

1. A ruler comprising a front surface and a back surface printed with bar coded information on said front surface, and said back surface to aid in measuring and inputting data electronically with the use of a bar code reader or a mobile computer eguipped with a bar code reader, comprising:
   on the front surface, graduations marked one inch apart, or marked one centimeter apart in metric applications;
   said graduations marked seguentially, starting with "1", and the bar code representing the value "1", and continuing with "2", and the bar code representing the value "2", through "24" and the bar code representing the value of "24";
   wherein said front surface of the ruler measures an object's width, or its x-dimension, in inches, or in centimeters in metric applications;
   on the back surface, imprinted bar code values for length and thickness, or y and z dimensions, of the object;
   length, or y-dimension, depicting unit of measure in feet, or meters in metric applications, labeled both in human readable form and bar code value;
   said length, or y-dimension, values marked seguentially, starting with "1", and the bar code representing the value "1", through "18", and the bar code representing the value "18";
   thickness, or z-dimension, depicting units in inches, or centimeters in metric applications, labeled in human-readable form and bar code value, and
   said thickness, or z-dimension, values marked sequentially, starting with "4", and the bar code representing the value "4", continuing with "5", "6", "8", "10", "12" and including all of the bar codes with corresponding values.

2. A software system operates in a mobile computer equipped with a bar code scanner, which reads the scanned values from the ruler as described in claim 1 via its scanner, and computes the spatial volume measurement of the object being measured upon receiving all three scanned dimensions, length, width, thickness (x, y, and z) values, and said software application stores the computed volume measurement data in its storage area, processes the said data, and transmits said data in electronic form to another computer or processor for further processing.

* * * * *